(12) United States Patent
Zhang et al.

(10) Patent No.: US 12,380,013 B2
(45) Date of Patent: Aug. 5, 2025

(54) METHOD AND APPARATUS FOR DETERMINING COLLECTION FREQUENCY OF A MONITORING DEVICE

(71) Applicant: Siemens Aktiengesellschaft, Munich (DE)

(72) Inventors: Liang Zhang, Beijing (CN); Wei Sun, Wuxi (CN); Yang Wang, Wuxi (CN); Li Hong Hu, Wuxi (CN)

(73) Assignee: SIEMENS AKTIENGESELLSCHAFT, Munich (DE)

(*) Notice: Subject to any disclaimer, the term of this patent is extended or adjusted under 35 U.S.C. 154(b) by 504 days.

(21) Appl. No.: 17/781,222

(22) PCT Filed: Nov. 28, 2019

(86) PCT No.: PCT/CN2019/121720
§ 371 (c)(1),
(2) Date: May 31, 2022

(87) PCT Pub. No.: WO2021/102838
PCT Pub. Date: Jun. 3, 2021

(65) Prior Publication Data
US 2023/0004475 A1 Jan. 5, 2023

(51) Int. Cl.
*G06F 11/34* (2006.01)
*G06F 11/30* (2006.01)

(52) U.S. Cl.
CPC ...... *G06F 11/3476* (2013.01); *G06F 11/3006* (2013.01)

(58) Field of Classification Search
CPC ............ G06F 11/3476; G06F 11/3006; G06F 11/3065; G06F 11/3096; G06F 11/3013;
(Continued)

(56) References Cited

U.S. PATENT DOCUMENTS

| | | | | |
|---|---|---|---|---|
| 10,467,036 | B2* | 11/2019 | Anwar | ............... G06F 11/3452 |
| 2002/0144162 | A1* | 10/2002 | Tada | ................ G06F 1/3203 |
| | | | | 713/300 |
| 2008/0066149 | A1* | 3/2008 | Lim | ................. H04L 51/234 |
| | | | | 726/1 |

(Continued)

FOREIGN PATENT DOCUMENTS

| | | | | |
|---|---|---|---|---|
| CN | 104380215 | | 2/2015 | ............ G05B 17/02 |
| CN | 108546595 | | 9/2018 | ............... C11B 9/00 |

(Continued)

OTHER PUBLICATIONS

Extended European Search Report, Application No. 19954495.8, 8 pages, Jun. 30, 2023.

(Continued)

*Primary Examiner* — Raymond N Phan
(74) *Attorney, Agent, or Firm* — Slayden Grubert Beard PLLC (57) ABSTRACT

Various embodiments include a method for determining a collection frequency of data. The data are collected from a device for an application program to monitor the device. The method may include: determining a collection frequency requirement of the application program regarding the data of the device; determining state information of the device; and determining, based on the determined collection frequency requirement of the application program regarding the data of the device and the determined state information of the device, a collection frequency of data according to a preset rule.

15 Claims, 4 Drawing Sheets

(58) Field of Classification Search
CPC ........ G06F 1/32; G06F 1/3203; G06F 1/3206; G06F 1/3209; G06F 1/3228
See application file for complete search history.

(56) References Cited

U.S. PATENT DOCUMENTS

| | | | |
|---|---|---|---|
| 2009/0006878 A1* | 1/2009 | Borghetti | G06F 1/3203 713/340 |
| 2009/0138737 A1* | 5/2009 | Kim | G06F 1/324 713/322 |
| 2013/0179893 A1 | 7/2013 | Ferdous et al. | 718/104 |
| 2015/0066468 A1 | 3/2015 | Damgaard | F03D 11/0091 |
| 2015/0309553 A1* | 10/2015 | Huang | G06F 11/3031 713/322 |
| 2016/0094401 A1 | 3/2016 | Anwar et al. | 709/223 |
| 2018/0070195 A1 | 3/2018 | Lei | H04W 4/006 |
| 2019/0188111 A1* | 6/2019 | Ozog | G06F 11/3612 |
| 2019/0243437 A1* | 8/2019 | Zhao | G06F 1/324 |
| 2022/0092544 A1* | 3/2022 | Travis | G06Q 10/063 |

FOREIGN PATENT DOCUMENTS

| | | | |
|---|---|---|---|
| CN | 108763040 | 11/2018 | ............. G06F 11/34 |
| WO | WO-2019050952 A1 * | 3/2019 | ......... G06F 16/2471 |

OTHER PUBLICATIONS

Search Report for International Application No. PCT/CN2019/121720, 4 pages, Aug. 26, 2020.

* cited by examiner

METHOD AND APPARATUS FOR DETERMINING COLLECTION FREQUENCY OF A MONITORING DEVICE

CROSS-REFERENCE TO RELATED APPLICATIONS

This application is a U.S. National Stage Application of International Application No. PCT/CN2019/121720 filed Nov. 28, 2019, which designates the United States of America, the contents of which are hereby incorporated by reference in their entirety.

TECHNICAL FIELD

The present disclosure generally relates to the technical field of the Internet of Things. Some embodiments of the teachings herein may include methods and/or apparatuses for determining a collection frequency.

BACKGROUND

Digitization is a trend being followed in the manufacturing industry. Device-related digitization is an important application in factories, especially cloud-based application programs such as device condition monitoring, Overall Equipment Effectiveness (OEE), fault diagnosis, and predictive maintenance. Therefore, how to efficiently collect valid field data of devices, for example, how to determine an appropriate frequency of data collection from devices, has become a key factor in providing a successful digitization solution.

At present, more and more devices that are highly diverse are in use in factories. Even for the same type of devices, the performance of their hardware and control systems varies considerably due to differences in purchase date and in hardware and software versions. Therefore, setting an appropriate collection frequency of data for a device is a complex task that should be handled by a very professional specialist.

The situation has worsened as application programs on the cloud become increasingly common. Providers/developers of cloud application programs tend to have a poorer understanding of true states of field devices. If they adopt a uniform collection frequency of data for devices without considering the types of devices, hardware and software versions, workloads of devices, etc., then frequent data collection may lead to a low production efficiency, a high defective rate, and even device damage.

Currently, a fixed collection frequency of data for a device is usually set on the basis of application programs, field testing, or experience, which requires the handling of a lot of tasks with the skills of very experienced engineers. In addition, a collection frequency needs to be adjusted on a trial-and-error basis, for example, at increasing defective rates and decreasing device operating speeds.

SUMMARY

The present disclosure describes adaptive methods for setting an appropriate collection frequency of data for a device. For example, some embodiments include a method for determining a collection frequency of data, wherein the data are collected from a device and are provided for an application program for the application program to monitor the device, wherein the method comprises: determining a collection frequency requirement of the application program regarding the data of the device; determining state information of the device; and determining, based on the determined collection frequency requirement of the application program regarding the data of the device and the determined state information of the device, a collection frequency of data according to a preset rule.

In some embodiments, the method further comprises receiving a real-time performance parameter of the device and, according to the real-time performance parameter, determining whether the collection frequency needs to be adjusted.

In some embodiments, a collection frequency requirement of the application program regarding the data of the device comprises at least one of the following: a collection frequency requirement of the application program itself; a collection frequency requirement of the application program in different states of the device; and a collection frequency requirement of the application program at different times.

In some embodiments, a collection frequency requirement of the application program itself comprises: a collection frequency, a minimum collection frequency, and a zero frequency; different states of the device comprise: an operating state, an idle state, a fault state, a repair state, and a maintenance state, the corresponding collection frequency, minimum collection frequency and zero frequency being provided for each state of the device respectively; and the time comprises operating hours, non-operating hours, and all day, the corresponding collection frequency, minimum collection frequency and zero frequency being provided for different times, respectively.

In some embodiments, state information of the device comprises at least one of the following: an operating state of the device; scheduled operating hours and non-operating hours of the device; a performance indicator of the device; and hardware information.

In some embodiments, an operating state of the device comprises at least one of the following: an operating state, an idle state, a fault state, a repair state and a maintenance state; a performance indicator of the device comprises at least one of the following: central processing unit usage, memory usage, input/output read time, and central processing unit temperature; and the hardware information comprises at least one of the following: version of central processing unit and version of memory.

In some embodiments, the real-time performance parameter comprises at least one of the following: real-time central processing unit usage, memory usage, network load, and response time of device.

As another example, some embodiments include an apparatus (200) for determining a collection frequency of data, wherein the data are collected from the device and provided to an application program for the application program to monitor the device, and the apparatus (200) comprises: a collection frequency requirement determining unit (202), configured to determine a collection frequency requirement of the application program regarding the data of the device; a device state determining unit (204), configured to determine state information of the device; and a collection frequency determining unit (206), configured to determine, based on the determined collection frequency requirement of the application program regarding the data of the device and the determined state information of the device, a collection frequency of data according to a preset rule.

In some embodiments, the apparatus further comprises a collection frequency adjusting unit (208), configured to receive a real-time performance parameter of the device and, according to the real-time performance parameter, determine whether the collection frequency needs to be adjusted.

In some embodiments, a collection frequency requirement of the application program regarding the data of the device comprises at least one of the following: a collection frequency requirement of the application program itself; a collection frequency requirement of the application program in different states of the device; and a collection frequency requirement of the application program at different times.

In some embodiments, a collection frequency requirement of the application program itself comprises: a default collection frequency, a minimum collection frequency, and a zero frequency; different states of the device comprise: an operating state, an idle state, a fault state, a repair state, and a maintenance state, the corresponding default collection frequency, minimum collection frequency and zero frequency being provided for each state of the device respectively; and the time comprises operating hours, non-operating hours, and all day, the corresponding default collection frequency, minimum collection frequency and zero frequency being provided for different times, respectively.

In some embodiments, state information of the device comprises at least one of the following: an operating state of the device; scheduled operating hours and non-operating hours of the device; a performance indicator of the device; and hardware information.

In some embodiments, an operating state of the device comprises at least one of the following: an operating state, an idle state, a fault state, a repair state and a maintenance state; a performance indicator of the device comprises at least one of the following: central processing unit usage, memory usage, input/output read time, and central processing unit temperature; and the hardware information comprises at least one of the following: version of central processing unit and version of memory.

In some embodiments, the real-time performance parameter comprises at least one of the following: real-time central processing unit usage, memory usage, network load, and response time of device.

As another example, some embodiments include a computing device (400) comprising: at least one processor (402); and a memory (404) coupled to the at least one processor (402), the memory being configured to store an instruction that, when executed by the at least one processor (402), causes the processor (402) to perform at least one of the methods as described herein.

As another example, some embodiments include a non-volatile machine-readable storage medium storing an executable instruction that, when executed, causes the machine to perform one or more of the methods as described herein.

As another example, some embodiments include a computer program comprising a computer-executable instruction that, when executed, causes at least one processor to perform one or more of the methods as described herein.

As another example, some embodiments include a computer program product physically stored on a computer-readable medium and comprising a computer-executable instruction that, when executed, causes at least one processor to perform one or more of the methods as described herein.

BRIEF DESCRIPTION OF THE DRAWINGS

The above-described and other objectives, features, and advantages of various embodiments of the teachings of the present disclosure will be more easily comprehensible with reference to the following description of embodiments in conjunction with the drawings. The components shown in the drawings are intended only to illustrate the principle of the present teachings. In the drawings, the same or similar technical features or components will be denoted by the same or similar reference signs.

DETAILED DESCRIPTION

In the methods described herein, an appropriate collection frequency of data for a device is determined considering a requirement of an application program and state information of the device. In addition, a collection frequency is automatically adjustable on the basis of real-time conditions of a device in the field.

In some embodiments, the data are collected from a device and are provided for an application program for the application program to monitor the device, and the method comprises: determining a collection frequency requirement of the application program regarding the data of the device; determining state information of the device; and determining, based on the determined collection frequency requirement of the application program regarding the data of the device and the determined state information of the device, the collection frequency of data according to a preset rule.

In some embodiments, a collection frequency requirement of the application program regarding the data of the device comprises at least one of the following: a collection frequency requirement of the application program itself; a collection frequency requirement of the application program in different states of the device; and a collection frequency requirement of the application program at different times.

In some embodiments, a collection frequency requirement of the application program itself comprises: a default collection frequency, a minimum collection frequency, and a zero frequency; different states of the device comprise: an operating state, an idle state, a fault state, a repair state, and a maintenance state, the corresponding default collection frequency, minimum collection frequency and zero frequency being provided for each state of the device respectively; and the time comprises operating hours, non-operating hours, and all day, the corresponding default collection frequency, minimum collection frequency and zero frequency being provided for different times, respectively.

In some embodiments, state information of the device comprises at least one of the following: an operating state of the device; scheduled operating hours and non-operating hours of the device; a performance indicator of the device; and hardware information.

In some embodiments, an operating state of the device comprises at least one of the following: an operating state, an idle state, a fault state, a repair state and a maintenance state; a performance indicator of the device comprises at least one of the following: central processing unit usage, memory usage, input/output read time, and central processing unit temperature; and the hardware information comprises at least one of the following: version of central processing unit and version of memory.

In some embodiments, the real-time performance parameter comprises at least one of the following: real-time central processing unit usage, memory usage, network load, and response time of device.

In some embodiments, there is an apparatus for determining a collection frequency of data, wherein the data are collected from the device and provided to an application program for the application program to monitor the device, and the apparatus comprises: a collection frequency requirement determining unit, configured to determine a collection frequency requirement of the application program regarding the data of the device; a device state determining unit, configured to determine state information of the device; and a collection frequency determining unit, configured to determine, based on the determined collection frequency requirement of the application program regarding the data of the device and the determined state information of the device, the collection frequency of data according to a preset rule.

In some embodiments, the apparatus for determining a collection frequency of data further comprises: a collection frequency adjusting unit, configured to receive a real-time performance parameter of the device and, according to the real-time performance parameter, determine whether the collection frequency needs to be adjusted.

In some embodiments, a collection frequency requirement of the application program regarding the data of the device comprises at least one of the following: a collection frequency requirement of the application program itself; a collection frequency requirement of the application program in different states of the device; and a collection frequency requirement of the application program at different times.

In some embodiments, a collection frequency requirement of the application program itself comprises: a default collection frequency, a minimum collection frequency, and a zero frequency; different states of the device comprise: an operating state, an idle state, a fault state, a repair state, and a maintenance state, the corresponding default collection frequency, minimum collection frequency and zero frequency being provided for each state of the device respectively; and the time comprises operating hours, non-operating hours, and all day, the corresponding default collection frequency, minimum collection frequency and zero frequency being provided for different times, respectively.

In some embodiments, state information of the device comprises at least one of the following: an operating state of the device; scheduled operating hours and non-operating hours of the device; a performance indicator of the device; and hardware information.

In some embodiments, an operating state of the device comprises at least one of the following: an operating state, an idle state, a fault state, a repair state and a maintenance state;

In some embodiments, a performance indicator of the device comprises at least one of the following: central processing unit usage, memory usage, input/output read time, and central processing unit temperature; and the hardware information comprises at least one of the following: version of central processing unit and version of memory.

In some embodiments, the real-time performance parameter comprises at least one of the following: real-time central processing unit usage, memory usage, network load, and response time of device.

In some embodiments, there is a computing device comprising: at least one processor; and a memory coupled to the at least one processor, the memory being configured to store an instruction that, when executed by the at least one processor, causes the processor to perform one or more of the methods as described above.

In some embodiments, a non-volatile machine-readable storage medium stores an executable instruction that, when executed, causes the machine to perform one or more of the methods as described above.

In some embodiments, a computer program comprises a computer-executable instruction that, when executed, causes at least one processor to perform one or more of the methods as described above.

In some embodiments, a computer program product is physically stored on a computer-readable medium and comprising a computer-executable instruction that, when executed, causes at least one processor to execute one or more of the methods as described above.

In a method for determining a collection frequency of data, a requirement of an application program may be met as much as possible while ensuring the proper operation of the device, so that interference with the proper operation of the device by data collection may be avoided. In some embodiments, configuration personnel do not need to meet any demanding requirements, and the workload and complexity of setting an appropriate collection frequency of data may be reduced, especially when thousands of different types of devices are used. In some embodiments, collection of any invalid data may be avoided, so as to reduce the amount of data collected, thereby lowering the cost of data communication, storage and processing.

| Reference signs | |
|---|---|
| 100: Method for determining a collection frequency of data | S102, S104, S106, S108: Step |
| 200: Apparatus for determining a collection frequency of data | 202: Collection frequency requirement determining unit |
| 204: Device state determining unit | 206: Collection frequency determining unit |
| 208: Collection frequency adjusting unit | 300: Information processing system |
| 302: Device | 304: Cloud platform |
| 306: Gateway | 400: Computing device |
| 402: Processor | 404: Memory |

The subject matter described herein will now be discussed below with reference to exemplary implementations. It should be understood that the discussion of these embodiments is only intended to allow those of ordinary skill in the art to better understand and implement the subject matter described herein, rather than limiting the scope of protection as defined by the claims, applicability, or examples. The functions and arrangements of the discussed elements may be changed without departing from the scope of protection of the present disclosure. In each example, various processes or components may be omitted, replaced, or added as needed. For example, a described method may be implemented in a sequence different from the described one, and various steps may be added, omitted, or combined. In addition, characteristics described with respect to some examples may also be combined in other examples.

As used herein, the term "comprising" and variants thereof mean open terms, meaning "including but not limited to". The term "on the basis of" means "based at least in part on". The terms "an embodiment" and "one embodiment" mean "at least one embodiment." The term "another embodiment" means "at least one other embodiment." The terms "first", "second", etc. may refer to different or the same objects. Other definitions may be included below, explicitly or implicitly. Unless clearly otherwise specified in the context, the definition of a term remains consistent throughout the description.

As mentioned above, application programs may be used to monitor various devices in a factory, such as monitoring device states, determining the Overall Equipment Effectiveness (OEE), performing fault diagnosis, and conducting predictive maintenance, and these functions need to be implemented on the basis of data collected from devices. The present disclosure provides an adaptive method for setting an appropriate collection frequency of data for a device.

In some embodiments, an appropriate collection frequency of data for a device is determined considering a requirement of an application program and state information of the device. In addition, a collection frequency is automatically adjustable on the basis of real-time conditions of a device in the field. In some embodiments, a requirement of an application program may be met as much as possible while ensuring the proper operation of the device. With these methods, the workload and complexity of configuring a data collection solution for thousands of devices are greatly reduced, the amount of invalid data collected is decreased, and, at the same time, normal production activities are ensured.

First, some basic rules related to a collection frequency of data to be considered in a method for determining a collection frequency of data according to the present disclosure are listed in Table 1 below.

collect data several times an hour, and some application programs may need to collect data more than a thousand times a second. In addition, in different states of a device or at different times, an application program has different collection frequency requirements regarding data. Therefore, in a method incorporating teachings of the present disclosure, a determined collection frequency requirement of an application program regarding data may comprise the following specific situations.

First, a collection frequency requirement of the application program itself is determined by a function of the application program. In some embodiments, a collection frequency requirement of an application program itself may comprise a default collection frequency, a minimum collection frequency, and a zero frequency. The default collection frequency is the optimal frequency for the application program and is used as long as the control system of the device can bear it. The minimum collection frequency is used when the control system of the device is too busy with performing proper operation to share any resources with the data collection function. If the control system of the device cannot bear even the minimum collection frequency, then a further reduction of the collection frequency should be attempted to ensure proper production work. The zero frequency means that no data collection is required.

For example, in the application scenario of preventive maintenance of a device, vibration data, current data, etc. need to be sampled with very great frequency to meet the requirements for subsequent data analysis; in a scenario where a device state is to be made transparent, highly

TABLE 1

| | Rule | Action required | Subject involved |
|---|---|---|---|
| 1 | Collect sufficient data to meet requirements of application programs. Requirements vary with application programs. Some application programs need to collect data several times a day, some application programs need to collect data several times an hour, and some application programs may need to collect data more than a thousand times a second. | Collect as much data as possible. | Application program |
| 2 | Reduce the amount of data collected, thus lowering the cost of big data transmission, storage, processing and visualization. | Avoid collecting data too frequently or collecting invalid data. | Server or cloud platform |
| 3 | Avoid affecting the proper operation of the device or lowering the operating efficiency of the device. | Adjust the collection frequency on the basis of the performance, such as CPU usage and RAM usage, of the control system of the device. | Production in factory |

Figure 1:
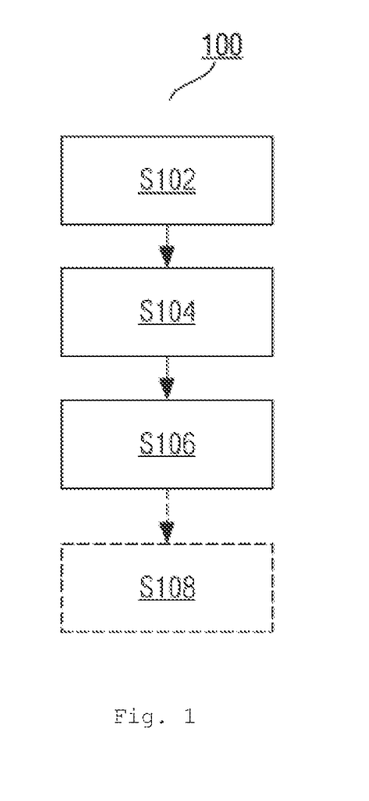
FIG. 1 is a flow chart of an exemplary process of a method for determining a collection frequency of data incorporating teachings of the present disclosure.

Based on the above-described basic rules, an example method for determining a collection frequency of data incorporating teachings of the present disclosure is depicted in FIG. 1. FIG. 1 is a flow chart of an exemplary process of a method 100 for determining a collection frequency of data. As shown in FIG. 1, first, in block S102, a collection frequency requirement of the application program regarding the data of the device is determined. Different application programs have different collection frequency requirements regarding data. Some application programs need to collect data several times a day, some application programs need to frequent sampling is not required and, usually, the requirement for making a device state transparent may be met at a sampling rate of 1 Hz.

In a scenario where energy consumption data are to be collected, the requirement of energy consumption management may be met by collecting data on the current energy consumption every hour or even within a longer sampling period, and data such as those on energy consumption may be collected when the device is not involved in any production productivities, so that the device operation remains unaffected.

Second, different states of the device can comprise: an operating state, an idle state, a fault state, a repair state, and a maintenance state. An application program may have different collection frequency requirements regarding data in different states of the device. For example, with an application program for monitoring energy consumption, the collection frequency should be low when the device is in idle mode, and should become higher when the device has switched to active mode; with an application program for predictive maintenance, data collection may not be required when the device is in idle or maintenance mode. In this case, the collection frequency of data may be greatly lowered to reduce the cost of data communication, storage and processing. Therefore, for each state of the device, the corresponding preferred collection frequency, minimum collection frequency, and zero frequency may also be set respectively. For example, when the device is in the "operating state", one of the default collection frequency, the minimum collection frequency, and the zero frequency set for the "operating state" may also be selected for data collection according to specific operating conditions of the device.

In addition, different work hours, including operating hours, non-operating hours, and 24 hours a day (such as morning shift, middle shift, and evening shift) may be defined in a factory, different data collection frequencies may also be set for different times, and, for example, a low frequency of data collection should be set during non-operating hours. In addition, each time period may also be provided with a corresponding default collection frequency, minimum collection frequency, and zero frequency, respectively.

Further, there may be a plurality of application programs for the same device, which means that a plurality of application programs may require the same data of the same device. In this case, requirements of the plurality of application programs may be combined such that collected data can meet the requirements of all the application programs.

Thus, through the operation performed in block S102, the collection frequency requirements of an application program regarding the data of a certain device under various circumstances may be determined. It is understandable that collection frequency requirements of the application program regarding the data of the device are not limited to those described above, and those of ordinary skill in the art, when using a method according to the present disclosure to determine a collection frequency of data, can also consider any other factor related to an application program and possibly affecting the collection frequency of data, which will not be described in detail again herein.

Next, in block S104, state information of the device is determined. State information of a device is collected from, for example, a field device in a factory, or from a third-party system. Device information may comprise, for example, the following: an operating state of the device; operating and non-operating hours of the device; a performance indicator of the device; and hardware information. An operating state of the device may be, for example, an operating state, an idle state, a fault state, a repair state, and a maintenance state. A performance indicator of the device comprises, for example, CPU usage, RAM usage, I/O read time, and CPU temperature.

For each device performance indicator, an experienced engineer can preset a threshold for evaluating the device performance indicator, or the device performance may be evaluated by an automatic evaluation method, for example, by measuring the response time of the control system of the device. Hardware information may comprise: CPU version and memory version. With hardware information, the collection frequency of one device may be used as a reference for another similar device. State information of a device is not limited to that described above, and those of ordinary skill in the art, when using a method incorporating teachings of the present disclosure to determine a collection frequency of data, can also consider any other device state information that affects the collection frequency of data, which will not be described in detail again herein.

Then, in block S106, the collection frequency of data is determined according to a preset rule on the basis of the determined collection frequency requirement of the application program regarding the data of the device and the determined state information of the device. A preset rule herein may comprise, for example, that the collection frequency should at least meet the minimum requirement for implementing the function of the application program; that, to avoid incurring excessive costs in data transmission, storage, processing and visualization, the collection frequency should not be too high; that the collection frequency should not affect the operating performance of the device; that different collection frequencies may be set for different device states; and that, for devices with different hardware and software, the corresponding collection frequency, etc. may be customized.

In some embodiments, an appropriate rule may be preset by those of ordinary skill in the art from experience, rather than being limited to the preset rule described above, and then an appropriate collection frequency of data for the device is automatically calculated on the basis of the determined collection frequency requirement of the application program regarding the data of the device and the determined state information of the device. In some embodiments, the method 100 for determining a collection frequency of data may further comprise performing the operation in block S108 to collect a real-time performance parameter of the device and, according to the real-time performance parameter, determine whether the collection frequency needs to be adjusted.

Specifically, real-time performance parameters, such as real-time CPU usage, RAM usage, network load, and response speed, of the device may be collected. For each performance parameter, a threshold may be preset, and the performance of the device may be determined by comparing the parameter with the threshold, so that whether it is necessary to adjust the collection frequency may be determined. In some embodiments, a test instruction may be sent to a device periodically, and then whether the response speed of the device is low may be determined by the response time of the device. Thus, a large number of tests may be automatically performed, and then the test data may be analyzed by a self-learning method to determine a threshold. By this means, it may be determined according to a real-time performance parameter that the state of the device has changed, or how the data collection has influenced normal production, etc., so that the collection frequency may be adjusted in a timely manner.

A collection frequency of data determined by a method incorporating teachings of the present disclosure may be provided, for example, to a gateway responsible for data collection, and the gateway collects data according to the determined collection frequency of data and provides the data to a corresponding application program. In some embodiments, it is possible to monitor the usage of the device in real time, and, for example, when the operating speed of the device has decreased, the collection frequency may be automatically reduced, and the updated collection frequency may be sent to the gateway. Even for different devices, there is no need to perform processing separately.

In some embodiments, a balance may be achieved between a requirement and an actual situation on the basis of the requirement of the application program and the operating condition of the field device. In some embodiments, a requirement of an application program may be met as much as possible while ensuring the proper operation of the device, so that interference with the proper operation of the device by data collection may be avoided. In some embodiments, configuration personnel do not need to meet any demanding requirements, and the workload and complexity of setting an appropriate collection frequency of data may be reduced, especially when thousands of different types of devices are used. In some embodiments, collection of any invalid data may be avoided, so as to reduce the amount of data collected, thereby lowering the cost of data communication, storage and processing.

Figure 2:
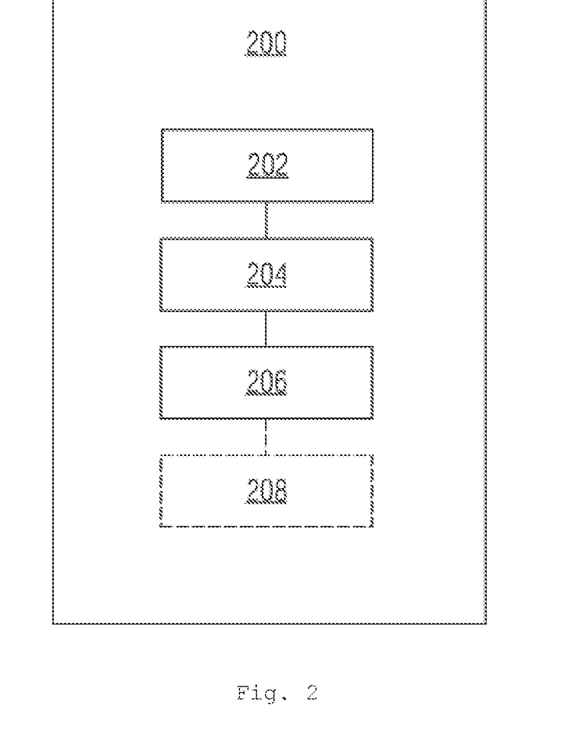
FIG. 2 is a block diagram of an exemplary configuration of an apparatus for determining a collection frequency of data incorporating teachings of the present disclosure.

FIG. 2 is a block diagram of an exemplary configuration of an apparatus 200 for determining a collection frequency of data incorporating teachings of the present disclosure. The apparatus 200 for determining a collection frequency of data comprises: a collection frequency requirement determining unit 202, a device state determining unit 204, and a collection frequency determining unit 206.

The collection frequency requirement determining unit 202 is configured to determine a collection frequency requirement of the application program regarding the data of the device.

The device state determining unit 204 is configured to determine state information of the device.

The collection frequency determining unit 206 is configured to determine, based on the determined collection frequency requirement of the application program regarding the data of the device and the determined state information of the device, the collection frequency of data according to a preset rule.

The apparatus 200 for determining a collection frequency of data may further comprise: a collection frequency adjusting unit 208, the collection frequency adjusting unit 208 being configured to receive a real-time performance parameter of the device and, according to the real-time performance parameter, determine whether the collection frequency needs to be adjusted. A collection frequency requirement of the application program regarding the data of the device comprises at least one of the following: a collection frequency requirement of the application program itself; a collection frequency requirement of the application program in different states of the device; and a collection frequency requirement of the application program at different times.

A collection frequency requirement of the application program itself comprises: a default collection frequency, a minimum collection frequency, and a zero frequency; different states of the device comprise: an operating state, an idle state, a fault state, a repair state, and a maintenance state, the corresponding default collection frequency, minimum collection frequency and zero frequency being provided for each state of the device respectively; and the time comprises operating hours, non-operating hours, and all day, the corresponding default collection frequency, minimum collection frequency and zero frequency being provided for different times, respectively.

State information of the device comprises at least one of the following: an operating state of the device; scheduled operating hours and non-operating hours of the device; a performance indicator of the device; and hardware information. An operating state of the device comprises at least one of the following: an operating state, an idle state, a fault state, a repair state and a maintenance state; a performance indicator of the device comprises at least one of the following: central processing unit usage, memory usage, input/output read time, and central processing unit temperature; and the hardware information comprises at least one of the following: version of central processing unit and version of memory.

The real-time performance parameter comprises at least one of the following: real-time central processing unit usage, memory usage, network load, and response time of device. It should be noted that the above-mentioned content related to a collection frequency requirement of the application program regarding the data of the device and the content related to state information of the device are merely exemplary, and the present disclosure is not limited thereto.

It should also be noted that the structures of the apparatus 200 for determining a collection frequency of data and constituent units thereof shown in FIG. 2 are merely exemplary, and that those of ordinary skill in the art can make modifications to the structural block diagram shown in FIG. 2 as required. The details of the operations and functions of various parts of the apparatus 200 for determining a collection frequency of data may be the same as or similar to relevant parts of an embodiment of the method 100 for determining a collection frequency of data of the present disclosure described with reference to FIG. 1, for example, and will not be described in detail again herein.

Figure 3:
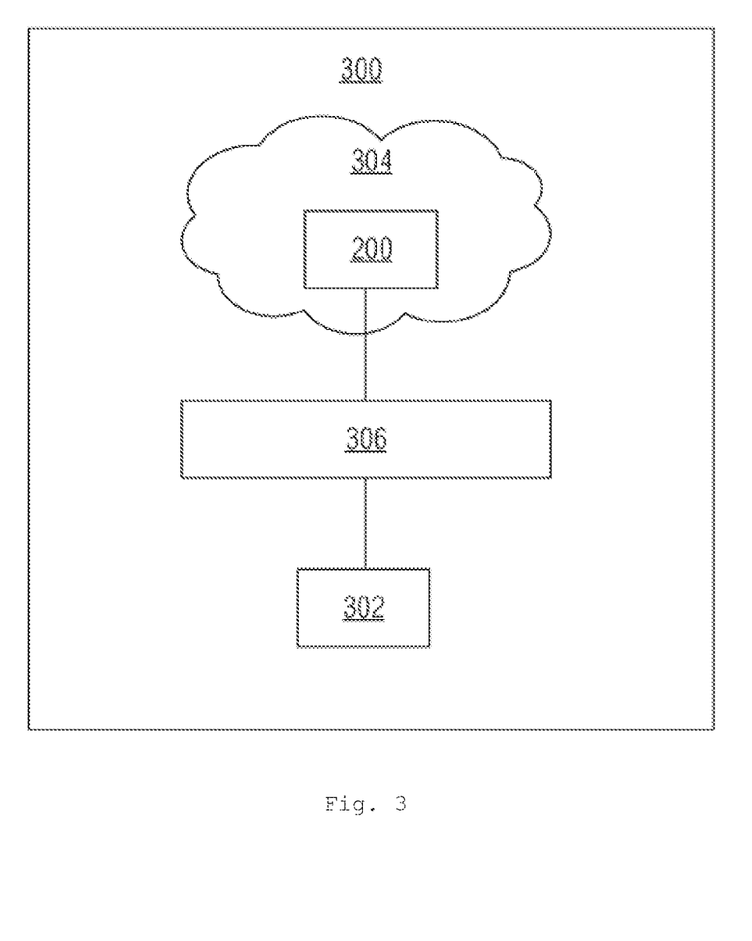
FIG. 3 is a block diagram of an exemplary configuration of an information processing system incorporating teachings of the present disclosure.

FIG. 3 is a block diagram of an exemplary configuration of an information processing system 300 incorporating teachings of the present disclosure. The information processing system 300 comprises a field device 302, a cloud platform 304, an apparatus 200 provided on the cloud platform 304 for determining a collection frequency of data, and a gateway 306. The apparatus 200 for determining a collection frequency of data provided on the cloud platform 304 can, by a method for determining a collection frequency of data described above with reference to FIG. 1, determine the frequency at which data are to be collected from the device 302. The apparatus 200 can provide the determined collection frequency of data to the gateway 306, and then the gateway 306 collects data from the device 302 according to the determined collection frequency of data and provides the data to the application program requiring the data.

In some embodiments, it is also possible for the gateway 306 to collect a real-time performance parameter of the device and provide the parameter to the apparatus 200 for determining a collection frequency of data, so that the apparatus 200 can, according to the real-time performance parameter, determine whether the collection frequency needs to be adjusted.

The information processing system 300 shown in FIG. 3 is only a specific application example of applying a method for determining a collection frequency of data according to the present disclosure. The apparatus 200 for determining a collection frequency of data, rather than being necessarily provided on the cloud platform 304, may also be provided on any appropriate place, for example, a local server. Further, the determined collection frequency of data, rather than being necessarily provided to a gateway, may also be provided to another third-party application program.

Embodiments of a method, an apparatus, and an information processing system for determining a collection frequency of data according to embodiments of the present disclosure have been described above with reference to FIG. 1 to FIG. 3. The above-described apparatus for determining a collection frequency of data may be implemented by hardware, or may be implemented by software or a combination of hardware and software.

Figure 4:
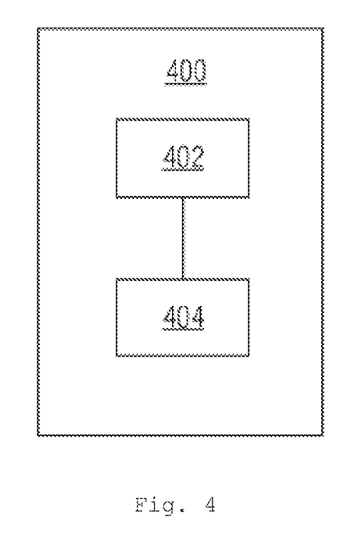
FIG. 4 is a block diagram of a computing device that prioritizes data incorporating teachings of the present disclosure.

FIG. 4 is a block diagram of a computing device 400 for determining a collection frequency of data incorporating teachings of the present disclosure. In some embodiments, the computing device 400 may comprise at least one processor 402, the processor 402 being configured to execute at least one computer-readable instruction (that is, the above-described element implemented by software) stored or encoded in a computer-readable storage medium (that is, a memory 404).

In some embodiments, an computer-executable instruction is stored in the memory 404 and, when executed, causes the at least one processor 402 to perform the following actions: determining a collection frequency requirement of the application program regarding the data of the device; determining state information of the device; and determining, based on the determined collection frequency requirement of the application program regarding the data of the device and the determined state information of the device, a collection frequency of data according to a preset rule. A computer-executable instruction stored in the memory 404, when executed, causes at least one processor 402 to perform various operations and functions described above with reference to FIG. 1-3.

In some embodiments, a non-volatile machine-readable medium may store a machine-executable instruction (that is, the above-described element implemented by software) that, when executed by a machine, causes the machine to perform various operations and functions described above with reference to FIG. 1-3. In some embodiments, a computer program comprises a computer-executable instruction that, when executed, causes at least one processor to perform various operations and functions described above with reference to FIG. 1-3. In some embodiments, a computer program product comprises a computer-executable instruction that, when executed, causes at least one processor to perform various operations and functions described above with reference to FIG. 1-3.

While exemplary embodiments have been described above in conjunction with specific embodiments illustrated by the drawings, the embodiments are not all embodiments that may be implemented or fall within the protection scope defined by the claims. The term "exemplary" used throughout this description means "serving as an example, instance, or illustration", instead of implying being "preferred" or "advantageous" over other embodiments. Specific embodiments include specific details for the purpose of providing an understanding of the described techniques. However, these techniques may be implemented without these specific details. In some examples, in order to avoid causing any difficulties in understanding the concepts of the described embodiments, well-known structures and devices are shown in the form of block diagrams.

The preceding description of the present disclosure is provided to allow those of ordinary skill in the art to implement or use the present disclosure. Various modifications may be made to the present disclosure, and that the general principles defined herein may also be applied to other variants without departing from the scope of protection of the present disclosure. Therefore, instead of being limited to the examples and designs described herein, the scope of disclosure is consistent with the widest scope that conforms to the principles and novel characteristics disclosed herein.

What is claimed is:

1. A method for determining a collection frequency of data, wherein the data are collected from a device for an application program to monitor the device, the method comprising:
    determining a collection frequency requirement of the application program regarding the data of the device;
    determining state information of the device; and
    determining, based on the determined collection frequency requirement of the application program regarding the data of the device and the determined state information of the device, a collection frequency of data according to a preset rule;
    wherein state information of the device comprises at least one datum selected from the group consisting of: an operating state, an idle state, a fault state, a repair state and a maintenance state.

2. The method as claimed in claim 1, further comprising receiving a real-time performance parameter of the device and, according to the real-time performance parameter, determining whether the collection frequency needs to be adjusted.

3. The method as claimed in claim 1, wherein a collection frequency requirement of the application program comprises at least one requirement selected from the group consisting of: a collection frequency requirement of the application program itself; a collection frequency requirement of the application program in different states of the device; and a collection frequency requirement of the application program at different times.

4. The method as claimed in claim 1, wherein state information of the device comprises at least one datum selected from the group consisting of: scheduled operating hours and non-operating hours of the device; a performance indicator of the device; and hardware information.

5. The method as claimed in claim 2, wherein the real-time performance parameter comprises at least one datum selected from the group consisting of: real-time central processing unit usage, memory usage, network load, and response time of device.

6. The method as claimed in claim 3, wherein: a collection frequency requirement of the application program itself comprises: a default collection frequency, a minimum collection frequency, and a zero frequency;
    different states of the device comprise: an operating state, an idle state, a fault state, a repair state, and a maintenance state, the corresponding preferred collection frequency, minimum collection frequency and zero frequency being provided for each state of the device respectively; and
    the time comprises operating hours, non-operating hours, and all day, the corresponding default collection frequency, minimum collection frequency and zero frequency being provided for different times, respectively.

7. The method as claimed in claim 4, wherein:
    a performance indicator of the device comprises at least one datum selected from the group consisting of: central processing unit usage, memory usage, input/output read time, and central processing unit temperature; and
    the hardware information comprises at least one datum selected from the group consisting of: version of central processing unit and version of memory.

8. An apparatus for determining a collection frequency of data, wherein the data are collected from the device and provided to an application program to monitor the device, the apparatus comprising:

a collection frequency requirement determining unit configured to determine a collection frequency requirement of the application program;

a device state determining unit configured to determine state information of the device; and a collection frequency determining unit configured to determine, based on the determined collection frequency requirement of the application program regarding the data of the device and the determined state information of the device, a collection frequency of data according to a preset rule.

9. The apparatus as claimed in claim 8, further comprising a collection frequency adjusting unit configured to receive a real-time performance parameter of the device and, according to the real-time performance parameter, determine whether to adjust the collection frequency.

10. The apparatus as claimed in claim 8, wherein a collection frequency requirement of the application program regarding the data of the device comprises at least one requirement selected from the group consisting of: a collection frequency requirement of the application program itself; a collection frequency requirement of the application program in different states of the device; and a collection frequency requirement of the application program at different times.

11. The apparatus as claimed in claim 8, wherein state information of the device comprises at least one datum selected from the group consisting of: an operating state of the device; scheduled operating hours and non-operating hours of the device; a performance indicator of the device; and hardware information.

12. The apparatus as claimed in claim 9, wherein the real-time performance parameter comprises at least one of the following: real-time central processing unit usage, memory usage, network load, and response time of device.

13. The apparatus as claimed in claim 10, wherein:
a collection frequency requirement of the application program itself comprises: a default collection frequency, a minimum collection frequency, and a zero frequency;

different states of the device comprise: an operating state, an idle state, a fault state, a repair state, and a maintenance state, the corresponding preferred collection frequency, minimum collection frequency and zero frequency being provided for each state of the device respectively; and the time comprises operating hours, non-operating hours, and all day, the corresponding preferred collection frequency, minimum collection frequency and zero frequency being provided for different times, respectively.

14. The apparatus as claimed in claim 11, wherein:
an operating state of the device comprises at least one of the following: an operating state, an idle state, a fault state, a repair state, and a maintenance state;

a performance indicator of the device comprises at least one of the following: central processing unit usage, memory usage, input/output read time, and central processing unit temperature; and the hardware information comprises at least one of the following: version of central processing unit and version of memory.

15. A computing device comprising:
a processor; and
a memory coupled to the processor, the memory configured to store an instruction when executed by the processor, causes the processor to:

determine a collection frequency requirement of the application program regarding the data of the device;

determine state information of the device; and determine, based on the determined collection frequency requirement of the application program regarding the data of the device and the determined state information of the device, a collection frequency of data according to a preset rule;

wherein state information of the device comprises at least one datum selected from the group consisting of: an operating state, an idle state, a fault state, a repair state and a maintenance state.

* * * * *